United States Patent
Callahan et al.

(10) Patent No.: US 7,566,079 B1
(45) Date of Patent: Jul. 28, 2009

(54) DUCT COUPLING

(76) Inventors: Douglas Callahan, 2531 Cedar Brook Ct., Rochester Hills, MI (US) 48309; Christopher Herbert Corbett, 1821 Lake Trail Dr., Delavin, WI (US) 53115

( * ) Notice: Subject to any disclaimer, the term of this patent is extended or adjusted under 35 U.S.C. 154(b) by 0 days.

(21) Appl. No.: 12/190,697

(22) Filed: Aug. 13, 2008

(51) Int. Cl.
F16L 37/18 (2006.01)
F16L 37/10 (2006.01)
F16L 37/12 (2006.01)

(52) U.S. Cl. .................. 285/362; 285/314; 285/319; 285/359

(58) Field of Classification Search .............. 285/86, 285/89, 358, 359, 360, 362, 394, 395, 401, 285/314, 317
See application file for complete search history.

(56) References Cited

U.S. PATENT DOCUMENTS

| 4,632,437 | A | * | 12/1986 | Robson et al. | 285/310 |
|---|---|---|---|---|---|
| 4,836,580 | A | * | 6/1989 | Farrell | 285/24 |
| 4,878,695 | A | * | 11/1989 | Whitham | 285/39 |
| 5,131,693 | A | * | 7/1992 | Miller | 285/364 |
| 5,356,181 | A | * | 10/1994 | Shirogane et al. | 285/86 |
| 5,356,183 | A | * | 10/1994 | Cole | 285/305 |
| 5,725,257 | A | * | 3/1998 | Sakane et al. | 285/81 |
| 7,185,923 | B2 | * | 3/2007 | McNeil et al. | 285/322 |
| 2003/0184091 | A1 | * | 10/2003 | Ricard | 285/358 |
| 2005/0121912 | A1 | * | 6/2005 | Benscoter et al. | 285/401 |
| 2007/0120362 | A1 | * | 5/2007 | Poder | 285/314 |

* cited by examiner

*Primary Examiner*—James M Hewitt
(74) *Attorney, Agent, or Firm*—Dickinson Wright PLLC

(57) ABSTRACT

A duct connection assembly suited to connect a thermoplastic fluid duct to a metal intake port. A connector housing is affixed to the end of the fluid duct and functions to releasable seal the fluid duct onto the intake port using an annular projection around the end of the port. When the port is inserted into the connector housing a snap lock connection is provided by a plurality of locking teeth that project inwardly through the housing from a collar to engage with the annular projection. Quick disconnect of the port from the fluid duct is effected by rotation of the collar with respect to the connector housing so that cam surfaces on the housing interact with the locking teeth to move the teeth radially outward to disengage from the annular projection.

7 Claims, 4 Drawing Sheets

DUCT COUPLING

TECHNICAL FIELD

This invention relates generally to fluid ducts and, more particularly, to the releasable, sealed joining together of fluid duct members.

BACKGROUND INFORMATION

Air flow is routed using tubular duct assemblies. The duct assemblies must be structurally robust to withstand the temperatures, vibrations, and fluid flow pressures to which they can be expected to encounter. In a typical automotive application, a duct assembly should tolerate sustained, continuous temperatures of 250° F. and higher and pressures of 30 pounds per square inch or more.

In the past, such duct assemblies have been constructed with a steel tube body with silicone and rubber end connectors, in order to withstand these pressures and temperatures. Typically for a conventional duct assembly, the end connectors are assembled with four band clamps and two hoses. These hose-and-clamp end connections prevent the pressurized fluid in the duct from bleeding out of the assembly along leak paths.

It has been proposed to form a duct assembly with a thermoplastic tube body and metal wire circumferential connections. For details, refer to patent publication no, US 2006/0022460 (publication of application Ser. No. 10/902,685, filed Jul. 29, 2004).

While previous duct assembly designs have been satisfactory, there remains room in the art for improvement. Reduction of weight and cost without loss of function is important to the advancement of automotive technology. Additionally, decreasing packaging, complexity and cost without sacrificing performance would also be desirable. Furthermore, functionality could be improved if the number of potential leak paths in the duct work can be reduced.

SUMMARY OF THE INVENTION

It is an advantage of the present invention to provide a duct assembly having a reduced cost of construction, reduced weight, fewer leak paths, a simple installation, and ease of recycling.

It is another advantage of the present invention to provide a duct assembly that is smaller and thus provides advantages in packaging. It is a further advantage of the present invention to provide a duct assembly that has fewer parts and thus has complexity.

In general terms, the present invention provides a duct assembly connector having a collar that defines a bore and has inwardly directed teeth such that the teeth engage an annular projection around a sleeve that fits inside the collar. The teeth are selectably retractable so that the sleeve can be disengaged from the collar. Retraction of the teeth is effected by rotation of a locking ring about the collar.

One aspect of the duct connector is that it is lightweight. That is because the structure for engaging the collar with the sleeve is formed as a single piece rather than as multiple pieces.

Another aspect of the duct connector is that it is not costly to manufacture. That is because the number of parts is minimized.

Yet another aspect of the duct connector is that it is more reliable. That is because the number of parts is minimized, thus decreasing the odds of any one part failing at a given time.

These and other features and advantages of this invention will become more apparent to those skilled in the art from the detailed description of a preferred embodiment. The drawings that accompany the detailed description are described below.

DETAILED DESCRIPTION

Figure 1:
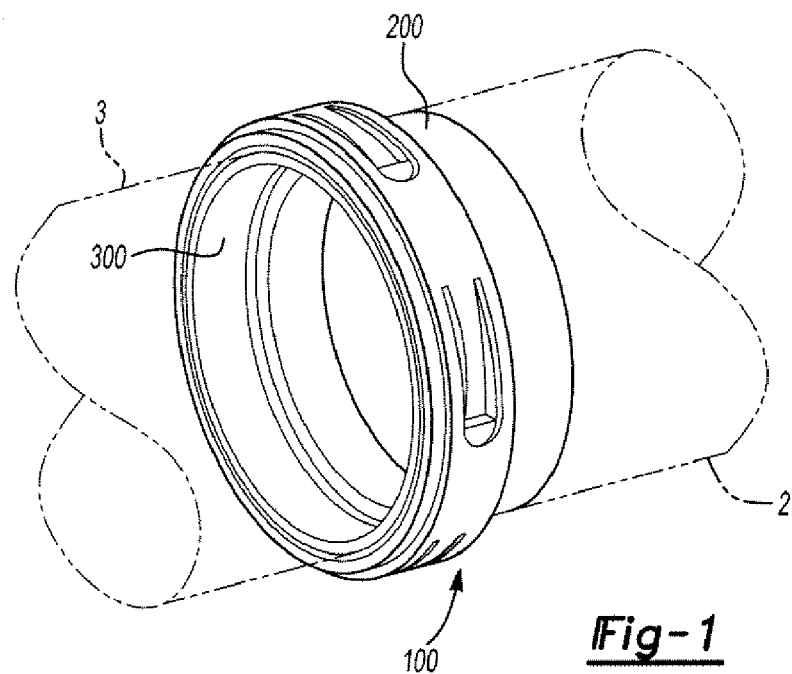
FIG. 1 shows a perspective view of an embodiment of the connector with the connector and fluid port locked together and with duct members shown in phantom in accordance with one embodiment of the present invention.
Figure 2:
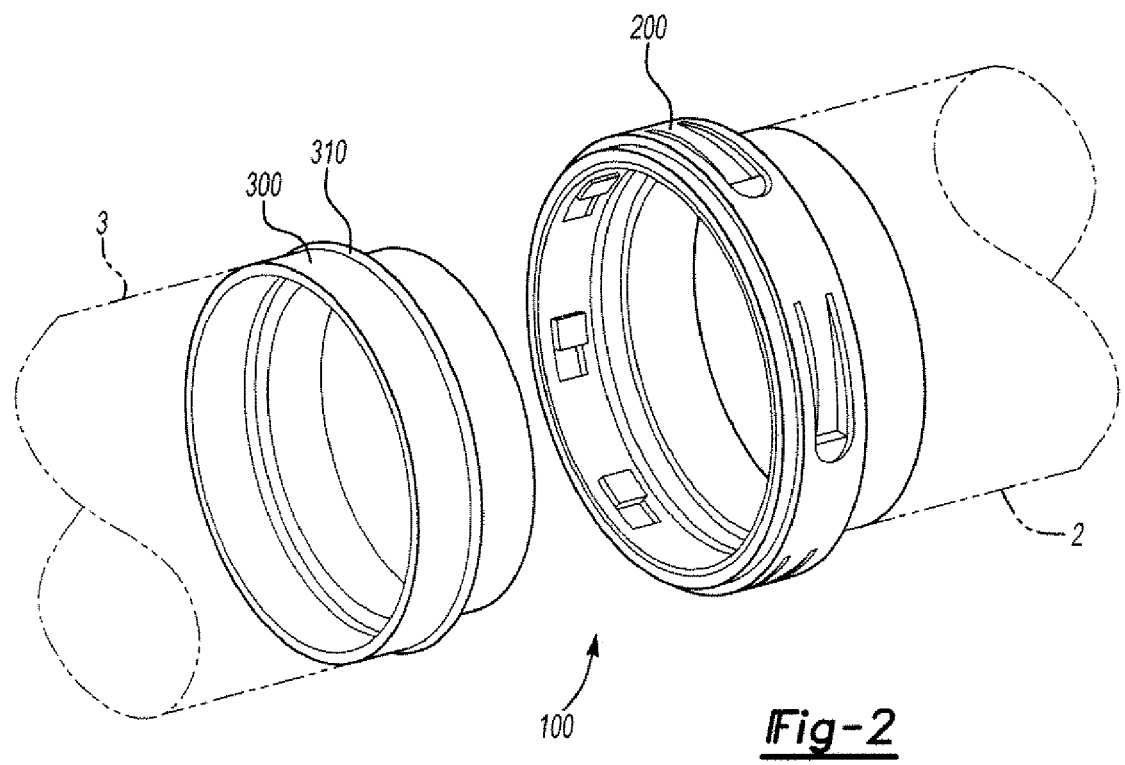
FIG. 2 shows a perspective view of an embodiment of the connector with the connector and fluid port separated and with duct members shown in phantom in accordance with one embodiment of the present invention.

Referring to FIG. 1, the connection assembly 100 is shown in perspective with the connector 200 and the fluid port 300 locked together. The opposed duct members 2, 3 to which the connection assembly 100 is to be fixed are shown in phantom. In FIG. 2, the connection assembly 100 is shown in perspective with the connector 200 and the fluid port 300 separated. An annular projection 310 is visible in FIG. 2 encircling the exterior surface of the fluid port 300. The opposed duct members 2, 3 are again shown in phantom.

The disclosed connector assembly 100 is well suited to the situation where fluid ducts of differing materials need to be joined together, but is not limited to such an interface. The connector assembly may be embodied to accommodate the situation where the fluid port is an open end of a metal duct and the connector is fixed to an end of another metal duct. The connector assembly may also be embodied to accommodate situations where the fluid port is an open end of a plastic duct and the connector is fixed to an end of a metal duct. Another situation for which the connector assembly may be embodied is where the fluid port is an open end of a metal duct and the connector is fixed to an end of plastic duct. Also, the connector assembly may be embodied to accommodate the situation where the fluid port is an open end of a plastic duct and the connector is fixed to an end of a plastic duct.

According to one embodiment the fluid port is a metal throttle body port and the connector is fixedly joined to an end of a plastic duct. When the connector and the duct to which it is fixedly joined are both formed of thermoplastic, they may be joined by welding, gluing, or may be formed together as an integral and unitary single piece (such as by injection molding or by hydroforming). According to another embodiment, the fluid port is a metal throttle body port and the connector is fixedly joined to an end of a metal duct.

Figure 3:
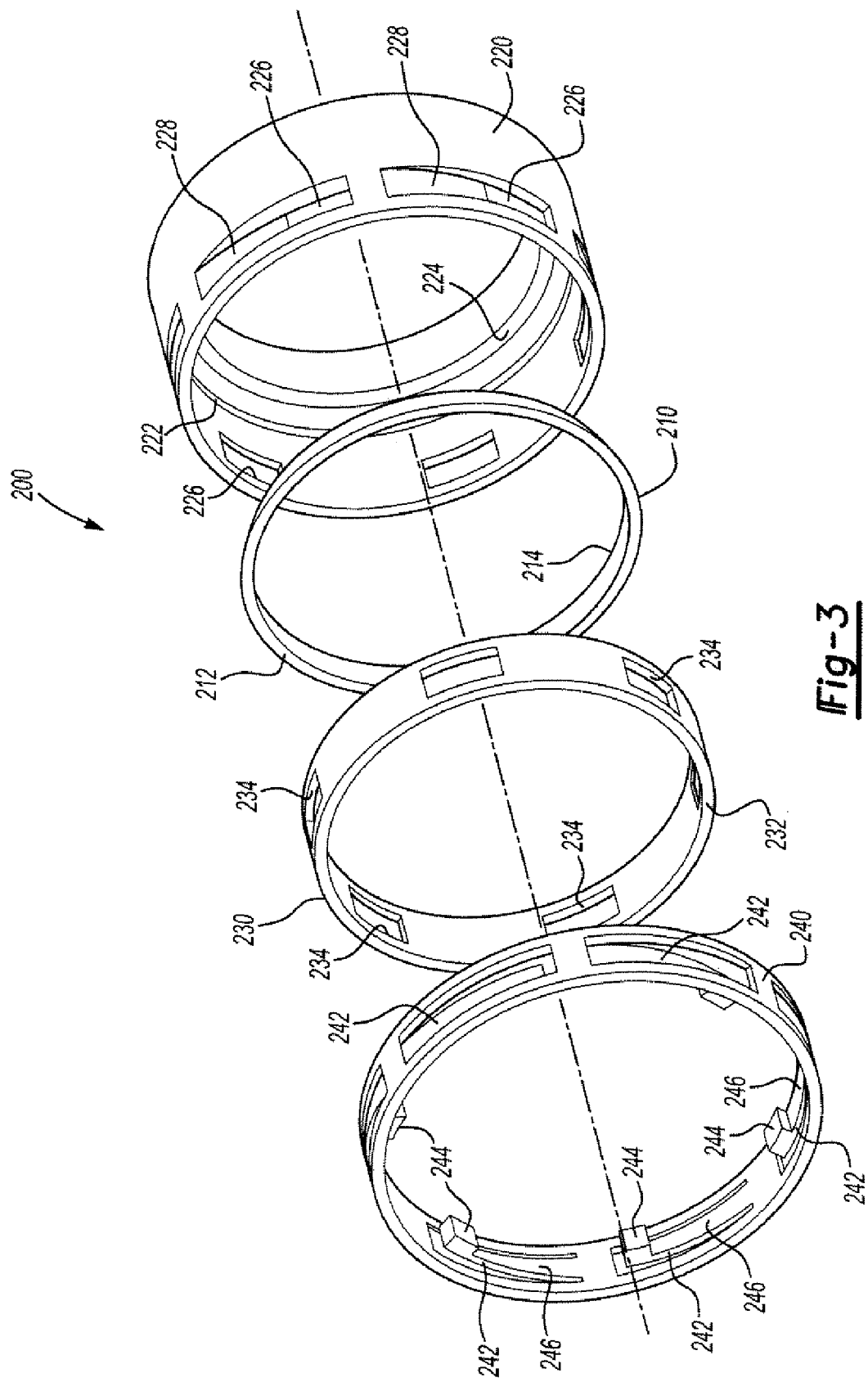
FIG. 3 shows an exploded view of an embodiment of the connector structures in accordance with one embodiment of the present invention.

Referring to FIG. 3, an exploded view shows the components of the connector 200. A seal 210 fits inside a connector housing 220. In one embodiment, the seal 210 is disposed in an undercut or groove 222 formed in an inner surface of the housing 220. The seal 210 preferably press fit into the undercut or groove 222. A retainer 230 is then disposed into the connector housing 230 thickness at its front-facing side 212.

The connector housing 220 is substantially cylindrical and hollow and is internally counter bored to have two undercut surfaces. The first undercut surface 222 is sized to hold the seal 210 in press fit engagement. The second surface 224 is an undercut surface that is sized to hinder axial progress of the fluid port 300 (see FIG. 2) through the housing 220. Radially spaced around the outer periphery of the housing 220 are plural housing slots 226. Each of the housing slots 226 is immediately adjacent one of plural cam surfaces 228.

The retainer 230 has a chamfer 232 at its front inside edge to ease insertion of the fluid port 300 into the connector 200. Radially spaced around the outer periphery of the retainer 230 are plural retainer slots 234. Each of the retainer slots 234 is disposed so as to align with a respective one of the housing slots 226 when the retainer 230 is disposed inside the housing 220.

An annular collar 240 is sized to fit around the outside of the housing 220 and has plural inwardly biased locking members 242. Each of the locking members 242 has a locking tooth 244 at its free end and each of the locking teeth 244 are sized to extend through a respective one of the plural housing slots 226 and a respective one of the plural retainer slots 234. The inner surface 246 of each of the locking members 242 engages a respective one of the cam surfaces 228 on the outside of the housing 220. The locking teeth 244 are each beveled on one side only to facilitate the teeth 244 sliding over the annular projection 310 while being displaced outwardly when the port 300 is inserted into the connector 200.

Figure 4:
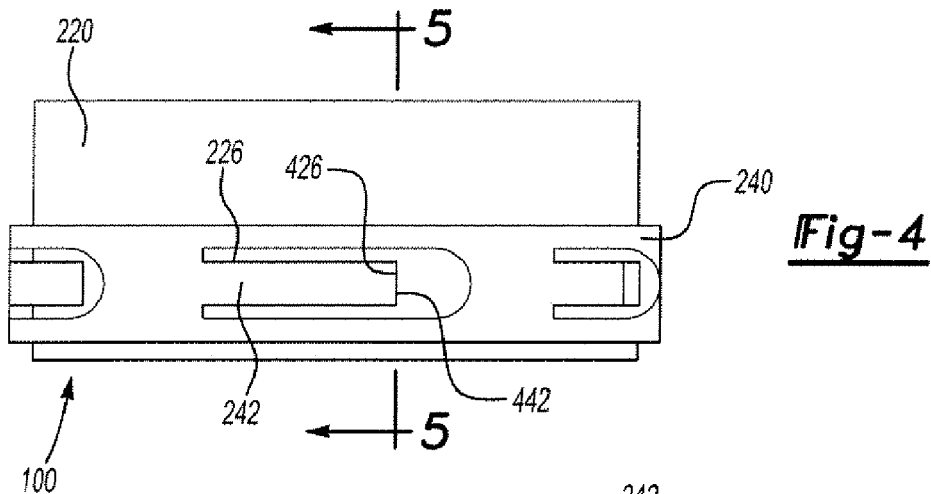
FIG. 4 shows a plan view of an embodiment of the connection assembly with the collar in a rest position in accordance with one embodiment of the present invention.

When installed about the housing 220 with its locking teeth 244 extending through the housing slots 226 and into the retainer slots 234, the collar is free to rotate about the housing 220 between two extreme positions, lock and unlock. Referring to FIG. 4, an embodiment of the connection assembly 100 is illustrated in a plan view with the collar 240 in a lock position. The collar 240 is placed in the lock position by rotating it in the direction the locking members 242 point until the free ends 442 of the locking members 242 are in contact with the visible ends 426 of the housing slots 226.

Figure 5:
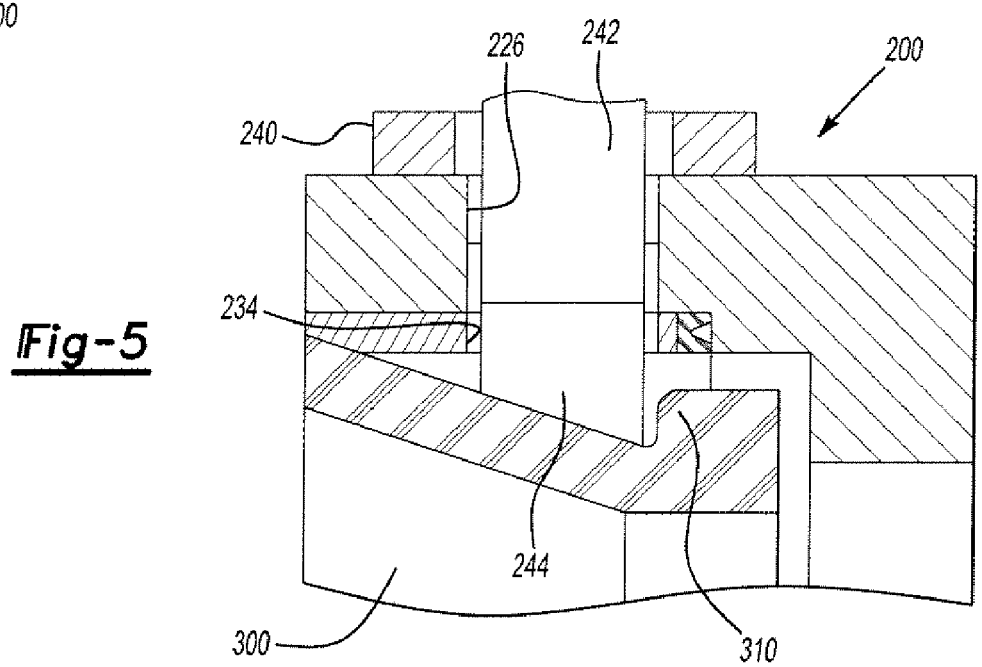
FIG. 5 shows a detail section view of the connection assembly of FIG. 4, with a locking tooth engaging the fluid port.

The lock position allows each locking tooth 244 to be pushed by the spring bias of the locking member 242 inward through the housing slot 226 and the retainer slot 234 and project into the interior cavity of the connector 200. This is shown in the detail section view of FIG. 5, which is taken along the section line labeled V-V in FIG. 4. By projecting into the interior cavity of the connector 200, the locking tooth 244 can engage the fluid port 300 at the annular projection 310. In this way, the connector 200 is locked to the fluid port 300.

Figure 6:
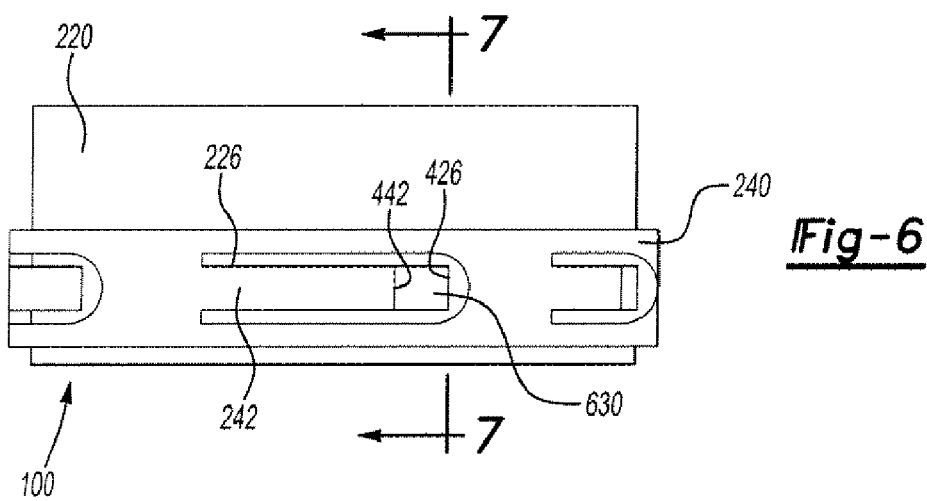
FIG. 6 shows a plan view of an embodiment of the connection assembly with the collar in a forced position in accordance with one embodiment of the present invention.

Referring to FIG. 6, a plan view of the connection assembly 100 is illustrated with the collar 240 in the unlock position. The collar 240 is placed in the unlock position by rotating it in the direction opposite how the locking members 242 point until the locking tooth 244 contacts the hidden end 626 of the housing slot 226. In the unlock position of the collar 240, there is a pronounced gap 630 between the free end 442 of the locking member 242 and the visible end 426 of the housing slot 226.

Figure 7:
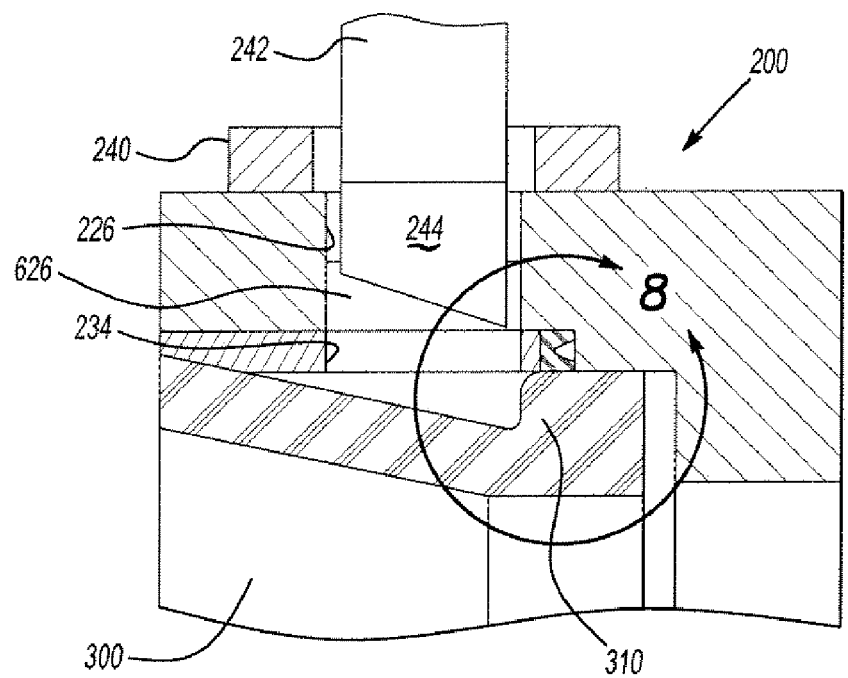
FIG. 7 shows a detail section view of the connection assembly of FIG. 6, with a locking tooth disengaged from the fluid port.

In the unlock position, each cam surface 228 engages the inner surface 246 (see FIG. 3) of the corresponding locking member 242 so as to move each locking member 242 outward against its bias. When locking members 242 have been moved outwards by rotation of the collar 240 into the unlock position, each locking tooth 244 is likewise caused to move outward so that the teeth 244 extend inward only through the housing slot 226 and into the retainer slot 234, without projecting into the interior cavity of the connector 200. This is shown in the detail section view of FIG. 7, which is taken along the section line labeled VII-VII in FIG. 6. Because the locking teeth 244 have been moved outward and do not extend into the interior cavity of the connector 200, the teeth 244 are disengaged from the annular projection 310 of the fluid port 300.

Figure 8:
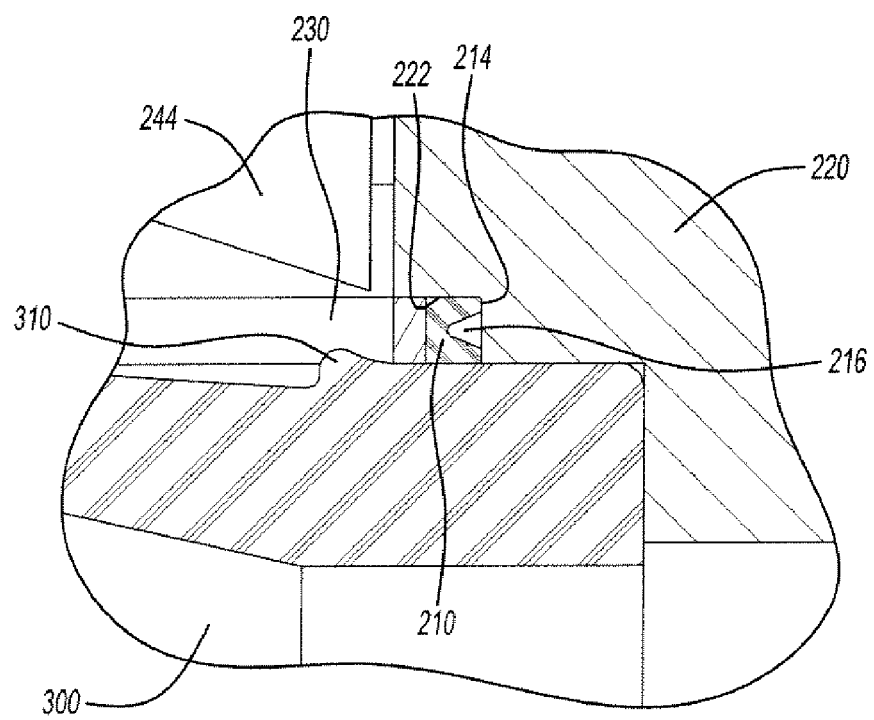
FIG. 8 shows a detail section view of the seal between the connector housing and the fluid port in accordance with one embodiment of the present invention.

One aspect of the connector 100 is that it provides for a sealing connection that prevents leaks. Referring to FIG. 8, a detail section view of the connector (taken at the detail line VIII shown in FIG. 7) shows the seal 210. The seal 210 is retained in place in the undercut surface 222. The seal 210 can also be compressed between the connector housing 220 and the fluid port 300.

In another embodiment, the rear-facing side 214 of the seal 210 has an internal void 216 to enable the seal 210 to compress readily between the connector housing 220 and the fluid port 300, and to provide a secure seal despite differences in how the connector housing 220 and the fluid port 300 may expand and contract with changes in temperature. It is noted that this exemplary seal is not the only type of seal that may be used to practice the invention and that seals having diverse cross-sections (e.g., O-rings) may be successfully be used.

To sealingly lock the fluid port 300 to the duct 2 and its connector 200, the end of the fluid port 300 is inserted into the connector 200 with the collar in the lock position. The outer diameter of the fluid port 300 matches the inner diameter of the seal 210. The annular projection 310 of the port 300 engages the locking teeth 244 of the inwardly biased locking members 242, urging the teeth 244 to move radially outward. The teeth 244 then snap inwardly into place behind the annular projection 310 and secure the fluid port 300 to the duct 2. The seal 210 is sealed to the port 300 and prevents leakage through the connector assembly 100.

According to one embodiment, the duct 2, the housing 220, the retainer 230, and the collar 240 are all constructed from a thermoplastic material. One example of a suitable material is non-filled Nylon 6, formed using a suction blow molding. During the suction blow molding process, a molten thermoplastic material is sucked into a closed mold by a vacuum created by a suction fan. Once the molten thermoplastic material has reached its final position, air is blown into the mold, forcing the thermoplastic material against the sides of the mold. After cooling, the part is removed. It is to be understood, however, that the duct 2, the housing 220, the retainer 230, and the collar 240 may alternatively be constructed from various other materials using a variety of different processes.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A connector for releasably sealing a first tube segment together with a second tube segment having an annular projection extending outwardly at an end of the second tube segment, the connector comprising:

a housing having a plurality of cam surfaces disposed on its exterior and being sized to accept insertion of the second tube segment into the housing, the housing being fixable to an end of the first tube segment;

a collar having a plurality of resiliently inwardly biased teeth, the collar being sized to encircle the housing and the teeth being configured around the collar to extend through the housing; and an annular seal disposed inside the housing;

wherein the collar is coaxially rotatable with respect to the housing so that in a lock rotational position of the collar the teeth extend inwardly so that the teeth are free to engage the annular projection, and so that in an unlock rotational position of the collar the teeth are displaced outwardly by respective ones of the cam surfaces to prevent the teeth from engaging the annular projection; and wherein the connector releasably engages the annular projection, to connect the first and second tube segments together with the seal sandwiched between an interior surface of the housing and an exterior surface of the second tube segment, when the collar is in the lock rotational position and the second tube segment is pushed into the housing so that the teeth snap into engagement with the annular projection.

2. The connector as recited in claim 1, further comprising: an undercut portion formed on an inner surface of the housing with the seal being received in the undercut portion by a snap fit connection.

3. A connector for releasably sealing a first tube segment together with a second tube segment having an annular projection extending outwardly at an end of the second tube segment, the connector comprising:

a housing having a plurality of cam surfaces disposed on its exterior and being sized to accept insertion of the second tube segment into the housing, the housing being fixable to an end of the first tube segment;

a collar having a plurality of resiliently inwardly biased teeth, the collar being sized to encircle the housing and the teeth being configured around the collar to extend through the housing; and an annular seal disposed inside the housing;

wherein the collar is coaxially rotatable with respect to the housing so that in a lock rotational position of the collar the teeth extend inwardly so that the teeth are free to engage the annular projection, and so that in an unlock rotational position of the collar the teeth are displaced outwardly by respective ones of the cam surfaces to prevent the teeth from engaging the annular projection; and wherein, when the collar is in the lock rotational position, insertion of the second tube segment into the connector causes outward displacement of the teeth by the annular projection followed by inward displacement of the teeth into locking engagement of the annular projection by the teeth to resist decoupling of the connector and the second tube segment.

4. The connector as recited in claim 3, further comprising: an undercut portion formed on an inner surface of the housing with the seal being received in the undercut portion by a snap fit connection.

5. A connector for releasably sealing a first tube segment together with a second tube segment having a port at its free end with an annular projection extending outwardly at the port, the connector comprising:

a housing having a plurality of housing slots and being sized so that the port is insertable into the housing a sufficient distance for the annular projection to move past the housing slots, the housing being fixable to an end of the first tube segment;

a collar having a plurality of resiliently inwardly biased teeth, the collar being sized to encircle the housing and the teeth being configured around the collar so that each of the teeth aligns with a corresponding one of the housing slots;

an annular seal disposed inside the housing; and a seal retainer sized to fit inside the housing with the seal held in place between the seal retainer and a stop surface of the housing and to accept insertion of the port into the housing, the seal retainer having a plurality of radially spaced retainer slots with each retainer slot being substantially in alignment with a corresponding one of the housing slots; and wherein the collar is coaxially rotatable with respect to the housing so that in a lock rotational position of the collar the teeth extend inwardly through corresponding housing slots and retainer slots so that the teeth are free to engage the annular projection, and so that in an unlock rotational position of the collar the teeth are displaced outwardly to prevent the teeth from engaging the annular projection.

6. The connector as recited in claim 5, wherein the teeth are each beveled on one side so that, upon insertion of the port into the connector with the collar in the lock rotational position, the teeth slide over the annular projection while being displaced outwardly.

7. The connector as recited in claim 5, wherein the teeth are each beveled on one side so that, upon insertion of the port into the connector with the collar in the lock rotational position, the teeth slide over the annular projection while being displaced outwardly and lock the port into the connector by engagement of an unbeveled side of each of the teeth with the annular projection.

* * * * *

UNITED STATES PATENT AND TRADEMARK OFFICE
CERTIFICATE OF CORRECTION

| | | |
|---|---|---|
| PATENT NO. | : 7,566,079 B1 | Page 1 of 1 |
| APPLICATION NO. | : 12/190697 | |
| DATED | : July 28, 2009 | |
| INVENTOR(S) | : Douglas Callahan and Christopher Corbett | |

It is certified that error appears in the above-identified patent and that said Letters Patent is hereby corrected as shown below:

In The Specification:

Column 1, Line 10, "duet" should read -- duct --

Signed and Sealed this

Twenty-second Day of September, 2009

David J. Kappos
*Director of the United States Patent and Trademark Office*